Oct. 14, 1930.  F. T. ROBERTS, JR  1,778,536
JACK ATTACHMENT FOR AUTOMOBILES
Filed Nov. 22, 1928
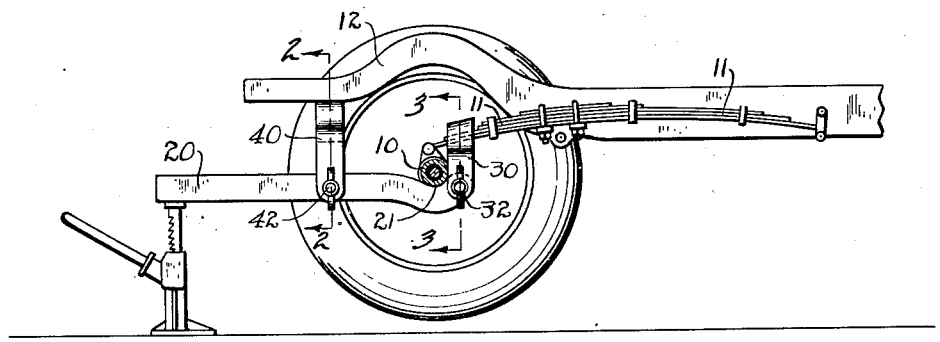
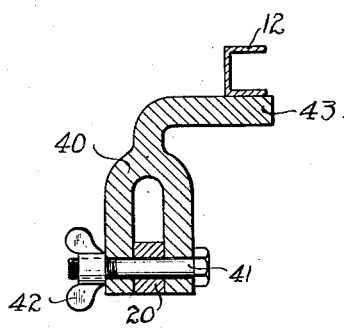 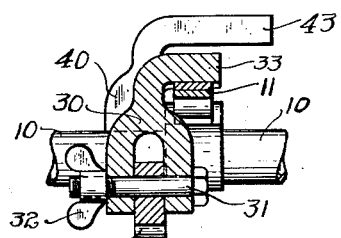
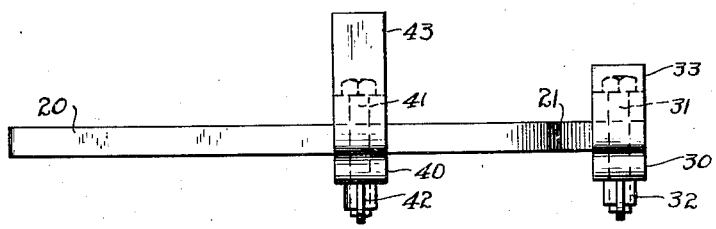
INVENTOR
BY
ATTORNEY Patented Oct. 14, 1930

1,778,536

UNITED STATES PATENT OFFICE

FRED THOMAS ROBERTS, JR., OF MALONE, NEW YORK

JACK ATTACHMENT FOR AUTOMOBILES

Application filed November 22, 1928. Serial No. 321,137.

This invention relates to a device adapted to be attached to an automobile, and form a conveniently accessible seat for the head of a lifting jack. In modern automobiles there is very little space available for applying a jack and frequently what space there is is quite inaccessible, particularly at the rear where the body extends beyond the rear axle, so that there is more or less difficulty in applying the jack, and one is liable to soil his garments in doing so. This is particularly true in the case of automobiles equipped with balloon tires, due to the lateral spread of the tire, and the fact that the clearance between the axle and the ground is very small when the tire is deflated.

I have discovered that these difficulties may be avoided by the use of a bar which may be easily anchored to the axle and spring structure of a motor car and which is adapted to project longitudinally, so that the outward portion may furnish an accessible seat for the jack. The device is well adapted to an automobile having a cantilever type of spring suspension, but, while it is particularly suitable for this use, it may also be employed with other types of spring suspension.

An object of my invention is to provide a simple device which can readily be attached to a motor car, and which will furnish an easily accessible seat for a jack. Another object of my invention is to provide a device of this type which is particularly adapted for use with an automobile having cantilever springs, but which also may be used with automobiles having other types of spring suspension.

A further object is to provide a jack attachment for automobiles which will place no undue strain on any part of the automobile when the jack is being used.

Other objects will appear from the following detailed description of a preferred form of my invention, reference being had to the accompanying drawings. The essential characteristics are summarized in the claims.

In the drawings, Fig. 1 is a side elevation, looking outwardly of the left rear wheel and the corresponding spring and chassis frame portion of an automobile, showing my attachment in place; Fig. 2 is a cross-section of the attachment taken along the line 2—2 of Fig. 1 and looking toward the rear; Fig. 3 is a similar cross section taken along the line 3—3 of Fig. 1; and Fig. 4 is a plan view of the attachment.

Referring more particularly to the drawings, 10 indicates the rear axle housing, 11 the adjacent rear spring and 12 the rearwardly extending portion of the chassis frame. My attachment as shown comprises a bar 20 having a depressed seat 21 adapted to engage the under side of the rear axle housing 10. An upwardly extending bifurcated member 30 is attached to the end of the bar 20 by means of the bolt 31 which passes through the bar 20 and is secured by the wing nut 32 (see Fig. 3). The upwardly extending member 30 has a laterally extending lip 33 which is adapted to bear on the upper surface of the spring 11 and thus prevent the bar 20 from turning around the axle when the jack is operated. As the bar 20 is held rigidly, operation of the jack will lift the car.

In order to prevent any undue strain on the spring 11, by reason of the downward pressure of the lip 33, I have provided another upwardly extending bifurcated member 40, as shown in Figs. 1, 2 and 4. This member is secured to the bar 20 by a bolt 41 and a wing nut 42, and has a laterally extending lip 43 which is adapted to engage the rearwardly extending part of the frame 12 and thus transmit a portion of the load directly to the frame when the car is lifted.

The device is applied to an automobile by placing the depressed seat 21 of the bar 20 beneath the axle housing 11, and bringing the laterally extending lip portions 33 and 43 respectively into engagement with the spring 11 and the frame portion 12. Then the jack can easily be applied to the end of the bar 20, and the car lifted.

The upwardly extending members 30 and 40 may easily be detached from the bar 20, and reversed, thus making it possible to jack up wheels on either the right or left side of the car with the same attachment. Obviously these members might be made with lips extending laterally on both sides, but I have found that an attachment made according to the drawings is easier to apply to the car, and also requires less space for storage in the car when not in use, than one made with lips extending on both sides.

It will be seen from the foregoing description that I have provided an extremely simple jack attachment which requires no permanent connection to the automobile, but may be easily stored and applied whenever desired, and, when applied, furnishes an easily accessible seat for a jack. Although I have described only the preferred form of my invention, I do not intend to limit myself thereto, further than required by the appended claims.

I claim:—

1. A jack attachment for automobiles comprising a bar adapted to engage a spring of the automobile, and means associated with the bar for transmitting a portion of the force exerted in lifting the automobile directly to the frame thereof.

2. A jack attachment for automobiles comprising a bar adapted to engage an axle of an automobile, means associated with the bar to prevent the bar from turning about the axle, and means associated with the bar for transmitting a portion of the force exerted in lifting the automobile directly to the frame thereof.

3. In a jack attachment for automobiles, the combination of a bar adapted to engage the under side of an axle, an upwardly extending member secured to the bar having a laterally extending lip for engaging the upper side of a spring, and an upwardly extending member secured to the bar intermediate its ends for engaging a portion of the frame of an automobile.

4. In a jack attachment for automobiles, the combination of a bar having a depressed seat adapted to engage an axle, an upwardly extending member secured to one end of the bar having a laterally extending lip for engaging a spring, and an upwardly extending member secured to the bar intermediate its ends, and having a laterally extending lip for engaging a portion of the frame of an automobile.

5. In a jack attachment for automobiles, the combination of a bar having a depressed seat adapted to engage an axle, an upwardly extending member pivoted to the end of the bar and having a laterally extending lip for engaging the spring and an upwardly extending member pivoted to the bar intermediate its ends and having a laterally extending lip for engaging a portion of the frame of the automobile.

6. A jack attachment for automobiles comprising, in combination, a bar adapted to engage an automobile axle, and a laterally projecting member reversibly secured to the bar and adapted to engage the automobile spring at the side of the bar, and a second member secured to the bar and adapted to engage the automobile frame.

7. In a jack attachment for automobiles, in combination, a bar adapted to engage an axle and a bifurcated member embracing the bar and having a laterally extending lip adapted to engage a spring of the automobile.

8. In a jack attachment for automobiles, the combination of a bar adapted to engage an axle, a member having a laterally extending lip, a removable bolt securing said member to the bar near the end of the bar, a second member, and a removable bolt securing it to an intermediate portion of the bar.

9. In a jack attachment for automobiles, the combination of a bar having a depressed seat adapted to engage an axle, an upwardly extending bifurcated member having a laterally extending lip for engaging the upper side of the spring, a removable bolt adapted to secure said member to the end of the bar, a second upwardly extending bifurcated member having a laterally extending lip for engaging the under side of a portion of the frame of the automobile, and a removable bolt adapted to secure said second member to the bar intermediate its ends.

In testimony whereof, I hereunto affix my signature.

FRED THOMAS ROBERTS, Jr.